Patented Oct. 27, 1942

2,300,168

UNITED STATES PATENT OFFICE 2,300,168

MOISTUREPROOF MATERIAL

Arloe R. Olsen, Wilmington, Del., assignor to Hercules Powder Company, Wilmington, Del., a corporation of Delaware No Drawing. Application September 12, 1939, Serial No. 294,481

4 Claims. (Cl. 117—146)

This invention relates to a moistureproof material, and more particularly to a base of cellulosic material having a moistureproof composition applied thereto.

The term "moistureproof," as understood by the art and as used in this specification, describes a coated base material which has a moisture permeability of, at most, one-tenth of the moisture permeability of the uncoated base material employed in its production, and also describes a coating composition capable of producing this reduction in moisture permeability when applied to a base material in a relatively thin coating of, for example, in a weight coating of from 2 to 5 pounds per 3000 square feet of base material. Heretofore it has been considered impossible to produce a composition capable of moistureproofing these base materials without the inclusion of a wax or waxy material in the moistureproofing composition. In fact, it has always been thought that the moistureproofing qualities of these compositions were due almost entirely to their wax content.

The inclusion of wax in various types of coating compositions in order to give them a moistureproofing character has produced many difficulties in the application of such coatings to base materials not encountered in the application of wax-free compositions. These difficulties have arisen particularly in the drying of the moistureproofing compositions, but have been regarded as caused by unavoidable characteristics inherent in moistureproofing compositions.

Now in accordance with this invention it has been found that an improved wax-free moistureproof material may be produced by coating a base material, as for example, sheet cellulosic material, preferably transparent, as glassine, regenerated cellulose, etc., cellulose esters, such as cellulose acetate, cellulose propionate, cellulose aceto-propionate, and ethers, such as ethyl cellulose, benzyl cellulose, etc., gelatine, agar-agar, etc., in sheet form, etc., with a moistureproof composition consisting essentially of chlorinated rubber, and, as a moistureproofing and plasticizing ingredient, a chlorinated cyclic hydrocarbon, as, for example, chlorinated naphthalene, chlorinated diphenyl, chlorinated retene, etc.

As is well known, chlorinated rubber is produced by treatment of vulcanized, unvulcanized, or reclaimed rubber, latex, gutta percha, balata, and the like with chlorine, and will contain widely varying amounts of chlorine in the form of $Cl_2$.

The chlorinated rubber for use in the moisture- proofing composition in accordance with this invention may be produced by the chlorination of raw or vulcanized rubber by any of the processes generally used in its production. Desirably, the chlorinated rubber employed will have a chlorine content of from about 60% to about 68%, although any chlorinated rubber having a chlorine content of 50% or more may be used. The viscosity characteristics of the chlorinated rubber employed may vary widely and will be selected with a view for the desired viscosity and chlorinated rubber content of the moistureproofing composition.

Any suitable chlorinated cyclic hydrocarbon, which is non-volatile and compatible with the chlorinated rubber in the proportions used, may be used in conjunction with the chlorinated rubber in formulating the moistureproofing compositions in accordance with this invention. The following compounds are examples of such materials: chlorinated naphthalene (Halowax 1013); chlorinated diphenyl (Aroclor 1254, 54% chlorine; Aroclor 1268, 68% chlorine); chlorinated retene (preferably containing about 35 to 40% chlorine); naphthalene derivatives, such as chlor-alpha-methyl naphthalene, chlor-beta-methyl naphthalene, chlor-alpha-ethyl naphthalene, chlor-beta-ethyl naphthalene; etc.

The exact formulation of the chlorinated rubber coating composition to be used in any given case will depend upon the flexibility desired, the degree of moistureproofness desired and the specific chlorinated cyclic hydrocarbon used as the moistureproofing plasticizer. For a given compound, the moistureproofness will increase in proportion to the amount of the cyclic compound used. This likewise is true for the flexibilty. When using the same proportion of different chlorinated cyclic hydrocarbons, different flexibilities and moisture permeabilities will be obtained. In other words, the effect of the various chlorinated cyclic hydrocarbons is not the same.

The relative proportions of chlorinated rubber and of the chemically different chlorinated cyclic hyrocarbon will depend upon the exact physical properties desired of the final film, and upon the degree of moistureproofness desired. An amount of the chlorinated cyclic hydrocarbon within the range of about 25% to about 75% by weight of the chlorinated rubber present will give desirable results, although I may use the chlorinated cyclic hydrocarbon in an amount within the range of about 30% to about 70%, and I prefer to use an amount within the range of about 35% to about 65% by weight of the chlorinated rubber present.

The following table shows typical proportions of non-volatile ingredients for moistureproofing compositions in accordance with this invention. The permeability values are for glassine paper coated with an indicated weight of coating per 3000 square feet of the respective compositions:

| Ingredient | Parts by weight | | |
|---|---|---|---|
| | 1 | 2 | 3 |
| Chlorinated rubber | 10 | 10 | 10 |
| Chlorinated naphthalene | 6 | | |
| Chlorinated diphenyl | | 6 | |
| Chlorinated retene | | | 6 |

| | Pounds | | |
|---|---|---|---|
| Weight of coating | 3.5 | 4 | 3 |

| | Grams water vapor per sq. meter per 24 hours | | |
|---|---|---|---|
| Permeability | 20 | 10 | 19 |

The permeability values given above are directly comparable with a permeability of 300–400 for uncoated glassine paper and of 71–108 for glassine coated with a 4 lb. coating of chlorinated rubber alone.

The non-volatile constituents of the moisture proofing compositions in accordance with this invention may be dissolved in a solvent, as, for example, benzene, toluene, xylol or ethyl acetate, coal tar naphtha, etc., for ready application to the base material. These solutions can then be applied very satisfactorily by the methods ordinarily used, such as spraying, dipping, coating by the use of a doctor blade, etc. The viscosity of the solution used will depend upon the type of sheet to which coating is to be applied, the method of application and the coating thickness desired. The exact viscosity which is to be used in any given case will be obvious to those skilled in the art. The viscosity of the solution used will depend on its total solids concentration and on the viscosity type of chlorinated rubber used. It is, of course, obvious that for a solution of a given viscosity the higher the solids content of the solution the thicker will be the film applied, and hence the more moistureproof the finished article. It will likewise be obvious that to obtain an increased solids content at a given solution viscosity it is merely necessary to use a chlorinated rubber of correspondingly lower viscosity type. A solids content of approximately 16% has been found in many cases to be desirable for ease of application and production of a suitably thick coating, but this may be varied widely and is not, of course, in any way critical.

The thickness of moistureproof coating to be applied to the base material must be sufficient to produce a sufficiently low permeability value, but, in most cases, not such as to impair the transparency of the finished product. A coating of 2 to 5 pounds per 3000 square feet of base material is adequate for moistureproofness and will not impair the transparency of the coated material.

It will be understood that the details and examples hereinbefore set forth are illustrative only, and are not in limitation of the invention as herein broadly described and claimed.

What I claim and desire to protect by Letters Patent is:

1. A moistureproof sheet material comprising a normally non-moistureproof cellulosic sheet coated with a 3 to 4 pounds per 3,000 square feet coat of a moistureproof composition consisting essentially of chlorinated rubber containing in excess of 50% of chlorine and a non-waxy chlorinated polycyclic hydrocarbon adapted to plasticize said chlorinated rubber and render it more moistureproof, said cyclic hydrocarbon and chlorinated rubber being present in proportions of about 3 to 5 and adapted to decrease the moisture vapor permeability of said coated cellulosic sheet between 93 to 97% as compared with the uncoated cellulosic sheet.

2. A moistureproof sheet material comprising a normally non-moistureproof cellulosic sheet coated with a 3.5 pounds per 3,000 square feet coat of a moistureproof composition consisting essentially of chlorinated rubber containing in excess of 50% of chlorine and chlorinated naphthalene present in proportions of about 5 to 3 and adapted to decrease the moisture vapor permeability of said coated cellulosic sheet between 93 and 95% as compared with the uncoated cellulosic sheet.

3. A moistureproof sheet material comprising a normally non-moistureproof cellulosic sheet coated with a 4.5 pounds per 3,000 square feet coat of a moistureproof composition consisting essentially of chlorinated rubber containing in excess of 50% of chlorine and chlorinated diphenyl present in proportions of about 5 to 3 and adapted to decrease the moisture vapor permeability of said coated cellulosic sheet between 96 and 98% as compared with the uncoated cellulosic sheet.

4. A moistureproof sheet material comprising a normally non-moistureproof cellulosic sheet coated with a 3.0 pounds per 3,000 square feet coat of a moistureproof composition consisting essentially of chlorinated rubber containing in excess of 50% of chlorine and chlorinated retene present in proportions of about 5 to 3 and adapted to decrease the moisture vapor permeability of said coated cellulosic sheet between 94 and 96% as compared with the uncoated cellulosic sheet.

ARLOE R. OLSEN.